United States Patent
Cheng

(10) Patent No.: US 12,282,150 B2
(45) Date of Patent: Apr. 22, 2025

(54) COMPENSATING MECHANISM

(71) Applicants: Sintai Optical (Shenzhen) Co., Ltd., ShenZhen (CN); Asia Optical Co., Inc., Taichung (TW)

(72) Inventor: Sung-Po Cheng, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 580 days.

(21) Appl. No.: 17/826,205

(22) Filed: May 27, 2022

(65) Prior Publication Data
US 2022/0413278 A1    Dec. 29, 2022

(30) Foreign Application Priority Data
Jun. 23, 2021 (CN) .......................... 202110701376.5

(51) Int. Cl.
*G02B 23/16* (2006.01)

(52) U.S. Cl.
CPC .................... *G02B 23/16* (2013.01)

(58) Field of Classification Search
CPC ...... G02B 23/14; G02B 23/16; G02B 23/105; G02B 7/004; F41G 1/38
USPC .......................................................... 42/135
See application file for complete search history.

(56) References Cited

U.S. PATENT DOCUMENTS

| | | | |
|---|---|---|---|
| 4,247,161 A * | 1/1981 | Unertl, Jr. | F41G 1/38 42/122 |
| 10,684,098 B2 * | 6/2020 | Tang | F41G 1/545 |
| 11,243,049 B1 * | 2/2022 | Enzinger | G02B 27/36 |
| 12,188,748 B1 * | 1/2025 | Zelenka | F41G 1/345 |
| 2013/0167425 A1 * | 7/2013 | Crispin | F41G 1/16 42/119 |
| 2013/0312310 A1 * | 11/2013 | Geller | F41G 1/38 42/122 |
| 2017/0328674 A1 * | 11/2017 | VanBecelaere | G02B 7/004 |
| 2019/0128644 A1 * | 5/2019 | Tang | F41G 1/545 |
| 2023/0099212 A1 * | 3/2023 | Toy | F41G 1/38 42/119 |

(Continued)

FOREIGN PATENT DOCUMENTS

| | | |
|---|---|---|
| CN | 103443576 B | 6/2015 |
| CN | 105953649 A | 9/2016 |

(Continued)

*Primary Examiner* — Samir Abdosh
(74) *Attorney, Agent, or Firm* — McClure, Qualey & Rodack, LLP

(57) ABSTRACT

A compensating mechanism includes a base unit, a transmission unit, an adjusting cap and a rotation setting unit. The base unit includes a grooved portion that includes a first groove and a second groove communicated with the first groove. The second groove includes a first end and a second end opposite to the first end. The first end is connected to the first groove. The first end and the second end have a height difference therebetween in an axial direction of the base unit. The transmission unit is disposed on the base unit. The adjusting cap is connected to the transmission unit. The adjusting cap drives the transmission unit to rotate when the adjusting cap is rotated. The rotation setting unit includes a movable element that is movably disposed on the transmission unit to be connected to the grooved element or to be separated from the grooved element.

20 Claims, 18 Drawing Sheets

(56) References Cited

U.S. PATENT DOCUMENTS

| | | | | |
|---|---|---|---|---|
| 2023/0134361 A1* | 5/2023 | Enzinger | .................. | F41G 1/38 |
| | | | | 42/122 |
| 2023/0194205 A1* | 6/2023 | Davidson | .................. | F41G 1/38 |
| | | | | 42/125 |
| 2024/0302642 A1* | 9/2024 | Pachta | ...................... | F41G 1/16 |
| 2024/0361103 A1* | 10/2024 | Davis | ...................... | F41G 1/545 |

FOREIGN PATENT DOCUMENTS

| | | |
|---|---|---|
| CN | 108204769 A | 6/2018 |
| CN | 109751916 A | 5/2019 |
| CN | 109932811 A | 6/2019 |
| TW | 201344145 A | 11/2013 |
| WO | 2020055319 A1 | 3/2020 |
| WO | 2020146385 A2 | 7/2020 |

\* cited by examiner

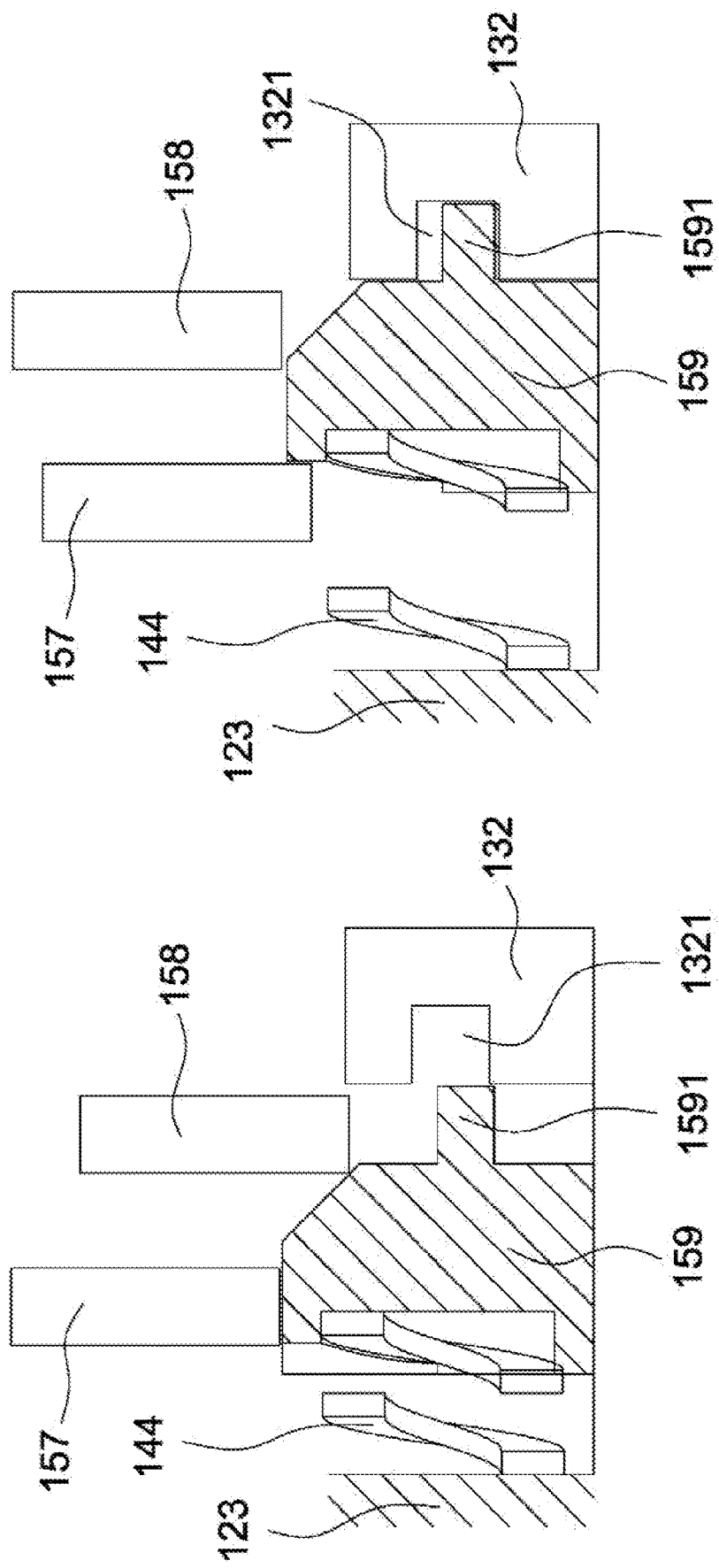

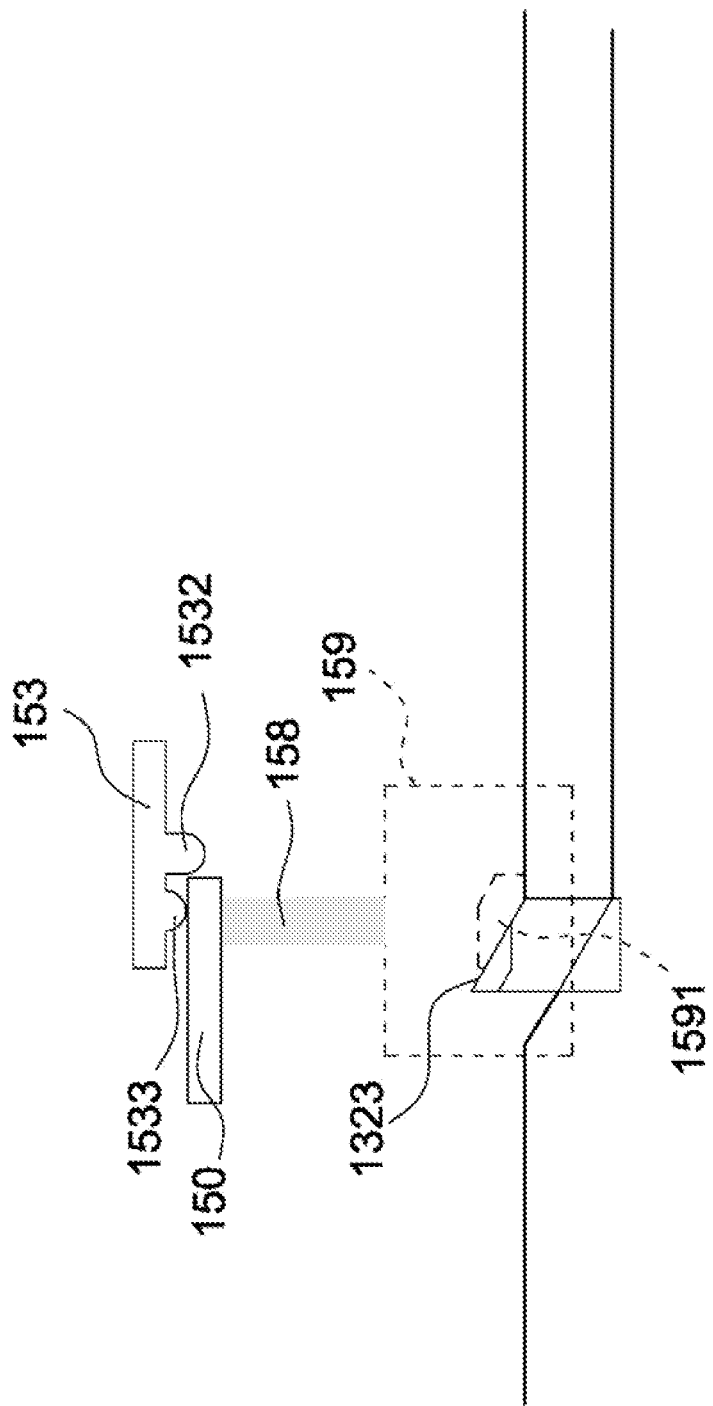

COMPENSATING MECHANISM

BACKGROUND OF THE INVENTION

Field of the Invention

The invention relates to a compensating mechanism for a sight, and more particularly to a compensating mechanism capable of changing the allowable number of rotation of the adjusting cap.

Description of the Related Art

Generally, a sight is provided with a compensating mechanism for elevation adjustment and windage adjustment. The compensating mechanism has an adjusting cap. In operation, the user rotates the adjusting cap to correct the bullet impact points. However, the adjusting cap of a conventional sight can be only rotated a fixed number of rounds (e.g. at most one round, two rounds or three rounds). The allowable number of rotation cannot be changed and therefore operation of the sight is not flexible.

BRIEF SUMMARY OF THE INVENTION

An object of the invention is to provide a compensating mechanism for a sight to address the above issue. The allowable number of rotation of the adjusting cap of the compensating mechanism can be changed in accordance with user's requirements. Therefore, operation of the sight of the invention is convenient.

The compensating mechanism in accordance with an exemplary embodiment of the invention includes a base unit, a transmission unit, an adjusting cap and a rotation setting unit. The base unit includes a grooved portion that includes a first groove and a second groove communicated with the first groove. The second groove includes a first end and a second end opposite to the first end. The first end is connected to the first groove. The first end and the second end have a height difference therebetween in an axial direction of the base unit. The transmission unit is disposed on the base unit. The adjusting cap is connected to the transmission unit. The adjusting cap drives the transmission unit to rotate when the adjusting cap is rotated. The rotation setting unit includes a movable element that is movably disposed on the transmission unit to be connected to the grooved element or to be separated from the grooved element.

In another exemplary embodiment, the rotation setting unit further includes a first constraining element. When the movable element is connected to the base unit and the adjusting cap is rotated, the movable element is driven by the adjusting cap through the transmission unit until the first constraining element is propped against the movable element.

In yet another exemplary embodiment, an allowable number of rotation of the adjusting cap is restricted when the movable element is moved to connect to the grooved portion.

In another exemplary embodiment, the allowable number of rotation of the adjusting cap is unrestricted when the movable element is moved to separate from the grooved portion.

In yet another exemplary embodiment, the movable element is restricted to move along the grooved portion when connecting to the grooved portion.

In another exemplary embodiment, the rotation setting unit further includes a first setting plate, a second setting plate and a third setting plate. The first setting plate includes an opening. The second setting plate includes a slit. The third setting plate includes a fixing hole. The first constraining element is elongated and includes an end portion and a main body. The end portion is fixed to the fixing hole. The main body extends in the slit, projects from the slit and is propped against the movable element to restrict an allowable number of rotation of the adjusting cap.

In yet another exemplary embodiment, the third setting plate is rotatable with respect to the first setting plate and the second setting plate to adjust a length of the main body of the first constraining element outside the opening.

In another exemplary embodiment, the rotation setting unit further includes a fourth setting plate and a compressing element. The fourth setting plate includes a first protrusion and a second protrusion. The first protrusion is raised higher than the second protrusion. The first constraining element is compressed by the compressing element. The compressing element is selectively compressed by the first protrusion or the second protrusion.

In yet another exemplary embodiment, the first groove includes a first sliding surface. The second groove includes a first guide surface disposed next to the first sliding surface. The movable element includes a laterally extending portion which is slidable on the first sliding surface. The first constraining element is propped against the movable element to stop the adjusting cap from rotation when the first constraining element is in a first position and the laterally extending portion reaches the first guide surface.

In another exemplary embodiment, the first groove further includes a first slope or a first curvature, the second groove further includes a second slope or a second curvature, the first slope is different from the second slope, and the first curvature is different from the second curvature.

In yet another exemplary embodiment, the base unit further includes a second sliding surface disposed next to the first guide surface. A distance between the first constraining element and the movable element is increased so that the laterally extending portion can pass through the first sliding surface and reach the second sliding surface when the first constraining element is moved from the first position to a second position.

In another exemplary embodiment, the base unit further includes a second guide surface disposed next to the second sliding surface. The first constraining element is propped against the movable element to prevent the adjusting cap from further rotation when the first constraining element is in the second position and the laterally extending portion reaches the second guide surface.

In yet another exemplary embodiment, the rotation setting unit further includes a second constraining element. The second constraining element is propped against the movable element to prevent a separation of the movable element from the base unit when the movable element is connected to the grooved portion of the base unit.

In another exemplary embodiment, the rotation setting unit further includes a first setting plate, a second setting plate and a third setting plate. The first setting plate includes an opening. The second setting plate includes a slit. The third setting plate includes a fixing hole. The second constraining element is elongated and includes an end portion and a main body. The end portion is fixed to the fixing hole. The main body extends in the slit, projects from the slit and is propped against the movable element to prevent a separation of the movable element from the base unit.

In yet another exemplary embodiment, the third setting plate is rotatable with respect to the first setting plate and the second setting plate to adjust a length of the main body of the second constraining element outside the opening.

In another exemplary embodiment, the base unit further includes an annular body and a blocking element. The annular body includes a concave portion, the first groove is formed on the annular body, a first sliding surface is formed in the first groove, and a second sliding surface is formed outside the first groove and is parallel to the first sliding surface. The blocking element is fixed to an interior of the concave portion, the second groove is formed on the blocking element and communicates with the first groove, a first guide surface is formed in the second groove and next to the first sliding surface, and a second guide surface is formed outside the second groove and next to the second sliding surface.

In yet another exemplary embodiment, the transmission unit includes a rotary shaft, the rotary shaft includes a hole containing the movable element, a dimension of the hole is greater than that of the movable element in a radial direction of the rotary shaft so that the movable element can be moved in the radial direction to separate from the blocking element, and another dimension of the hole is greater than that of the movable element in an axial direction of the rotary shaft so that the movable element can be moved in the axial direction to change an allowable number of rotation of the adjusting cap.

In another exemplary embodiment, the compensating mechanism includes a base unit, a transmission unit, an adjusting cap and a rotation setting unit. The base unit includes a blocking element. The transmission unit is disposed on the base unit. The adjusting cap is connected to the transmission unit, wherein the adjusting cap drives the transmission unit to rotate when the adjusting cap is rotated. The rotation setting unit includes a movable element, wherein the movable element is movably disposed on the transmission unit to be connected to the blocking element for restricting an allowable number of rotation of the adjusting cap or to be separated from the blocking element for unrestricting the number of rotation of the adjusting cap.

A sight in accordance with an exemplary embodiment of the invention includes a main body, an objective lens unit, an ocular lens unit, an erecting lens barrel and the above-mentioned compensating mechanism. The objective lens unit and the ocular lens unit are disposed at both ends of the main body. The erecting lens barrel is disposed within the main body and between the objective lens unit and the ocular lens unit. The compensating mechanism is disposed on the main body, penetrated into the main body and placed against the erecting lens barrel.

BRIEF DESCRIPTION OF THE DRAWINGS

The invention can be more fully understood by reading the subsequent detailed description and examples with references made to the accompanying drawings, wherein:

FIG. 8 depicts the relative positions of the movable element, the blocking element, the first constraining element and the second constraining element of the compensating mechanism of FIG. 1 in a normal mode.

FIG. 9 depicts the relative positions of the movable element, the blocking element, the first constraining element and the second constraining element of the compensating mechanism of FIG. 1 in a one-round mode.

FIGS. 13-16 depict movement of the movable element of the compensating mechanism of FIG. 1 in the two-round mode, wherein the annular body of the base unit of the compensating mechanism is traverse sectioned and flattened.

DETAILED DESCRIPTION OF THE INVENTION

Figure 1:
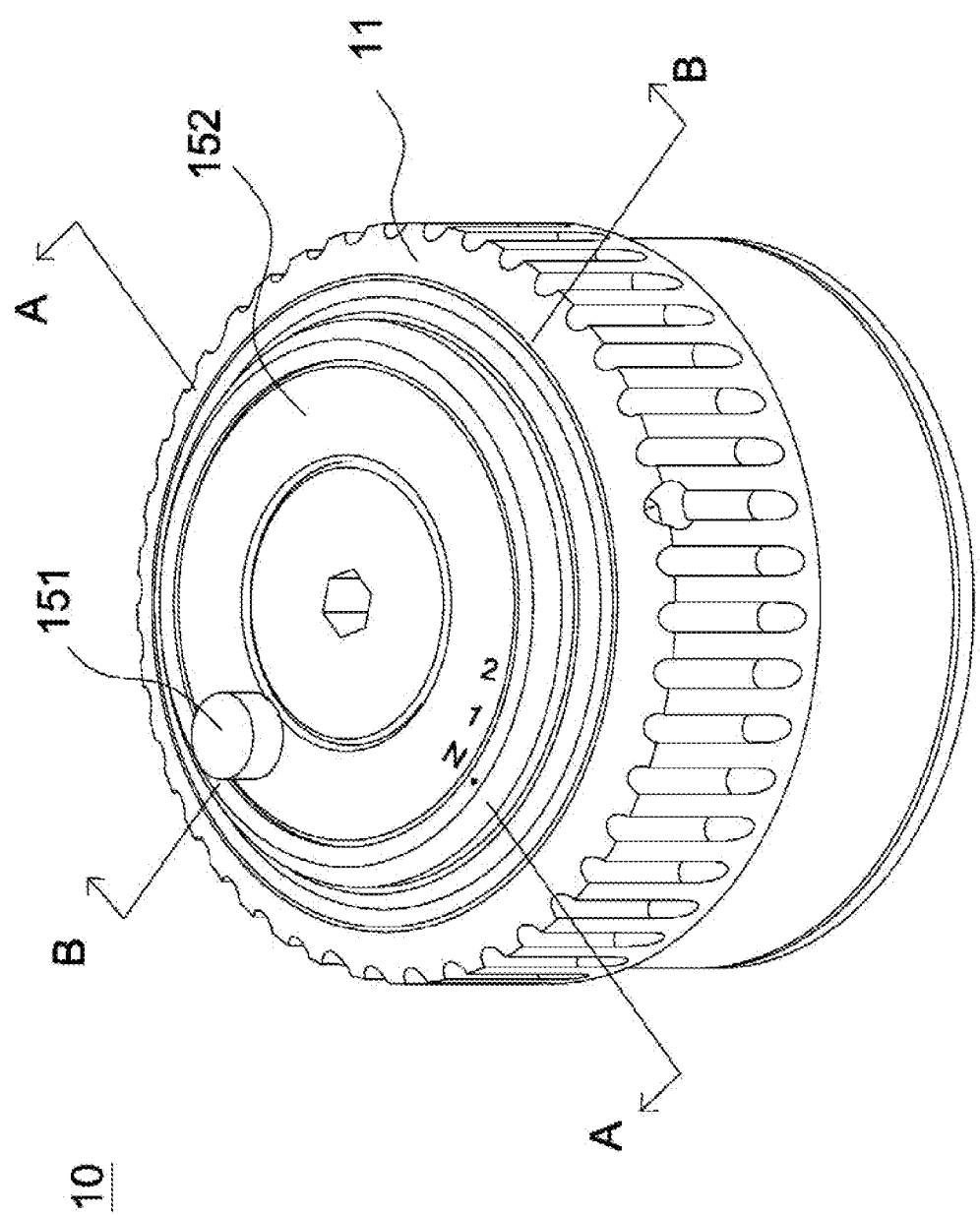
FIG. 1 is a perspective view of a sight in accordance with an embodiment of the invention.
Figure 2A:
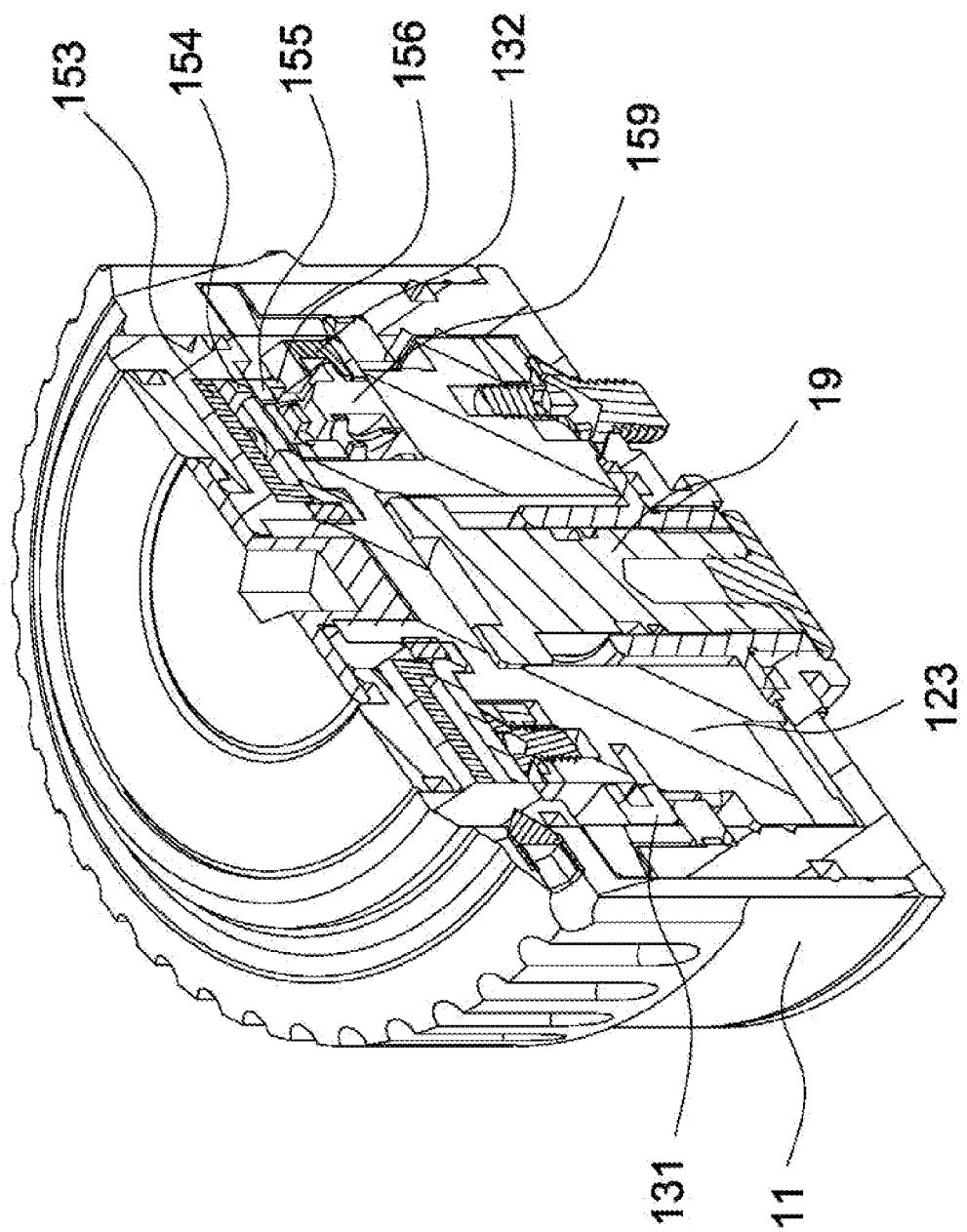
FIG. 2A is a perspective view showing the compensating mechanism sectioned along A-A of FIG. 1.
Figure 2B:
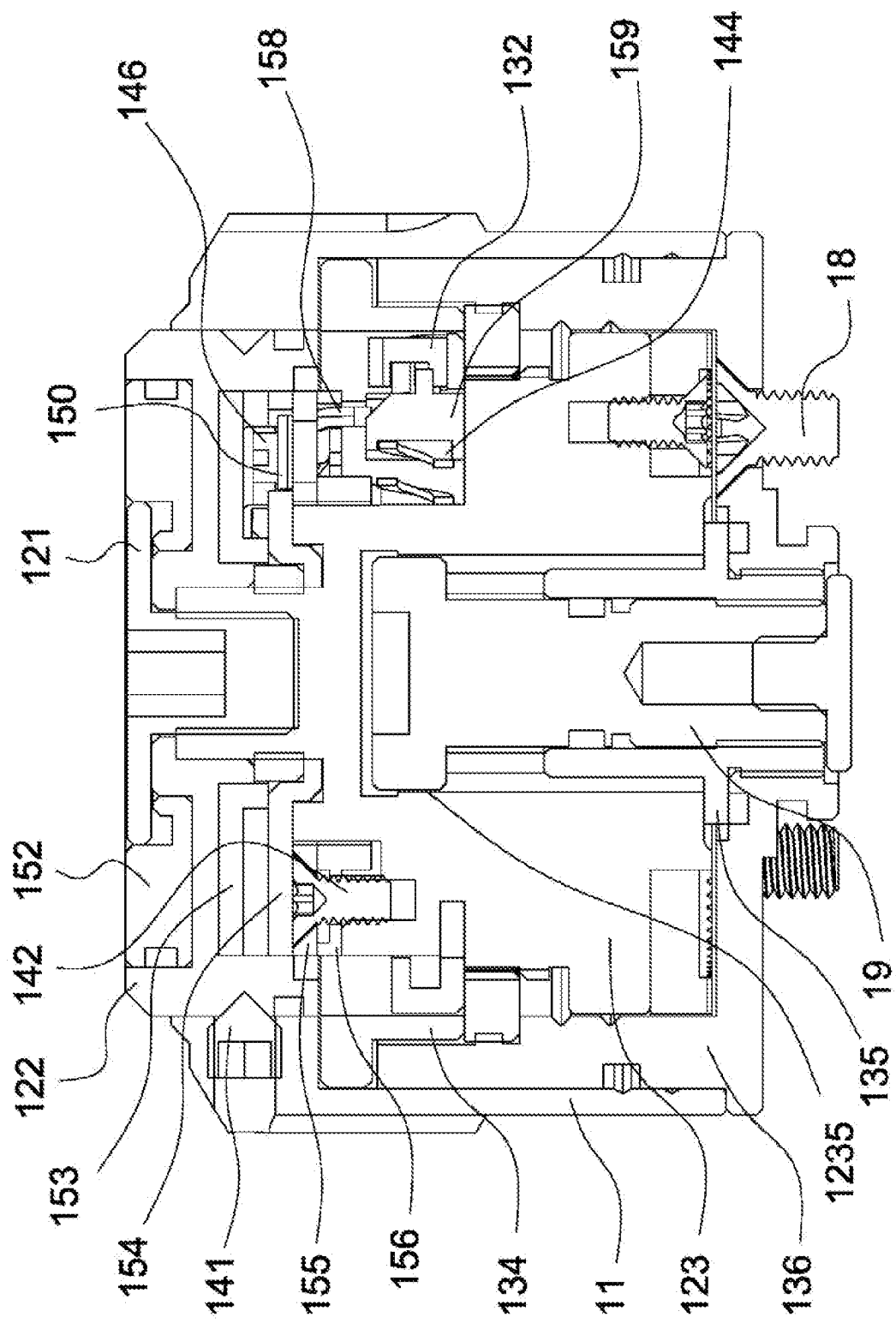
FIG. 2B is a sectional view of the compensating mechanism sectioned along A-A of FIG. 1.
Figure 3A:
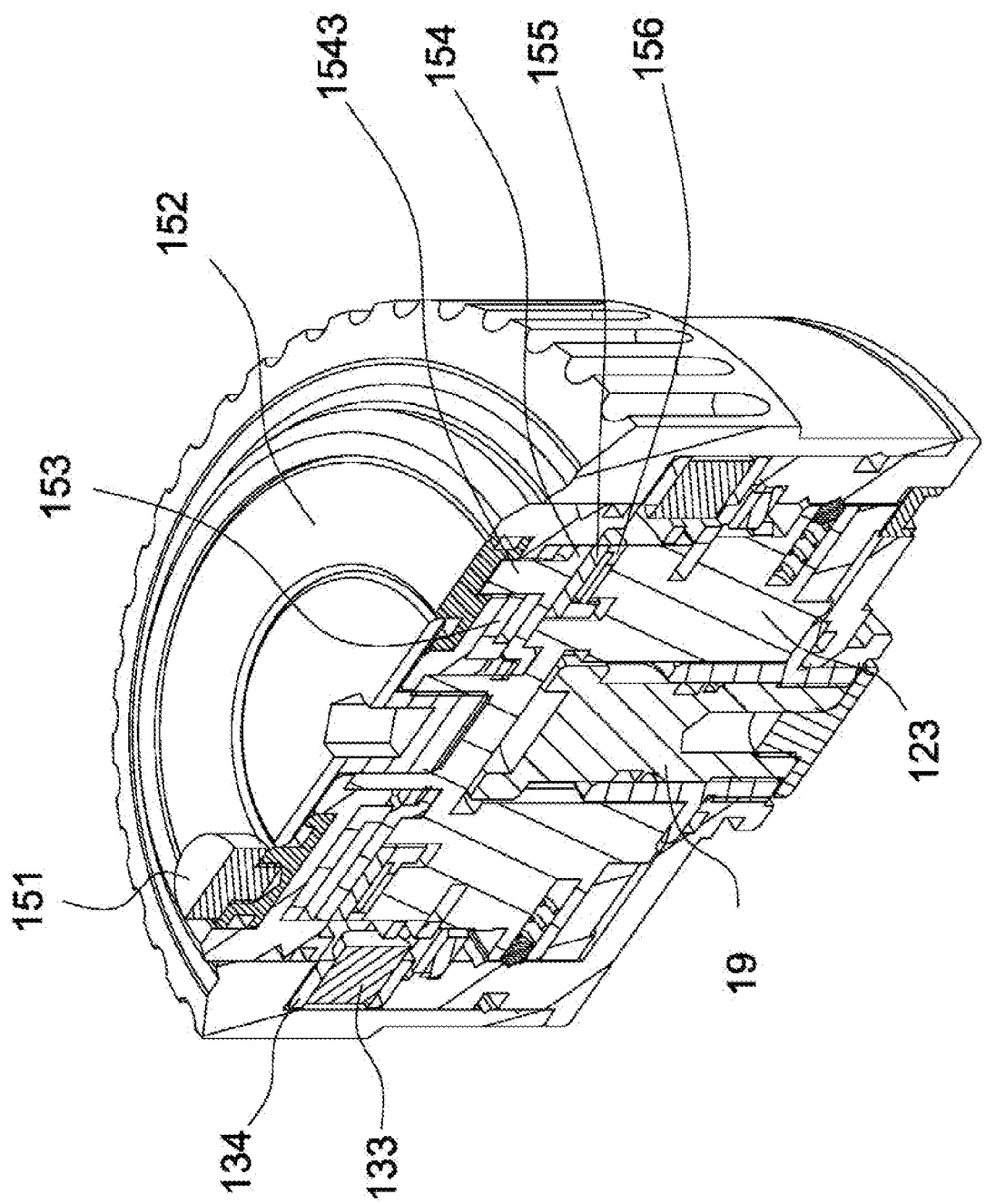
FIG. 3A is a perspective view showing the compensating mechanism sectioned along B-B of FIG. 1.
Figure 3B:
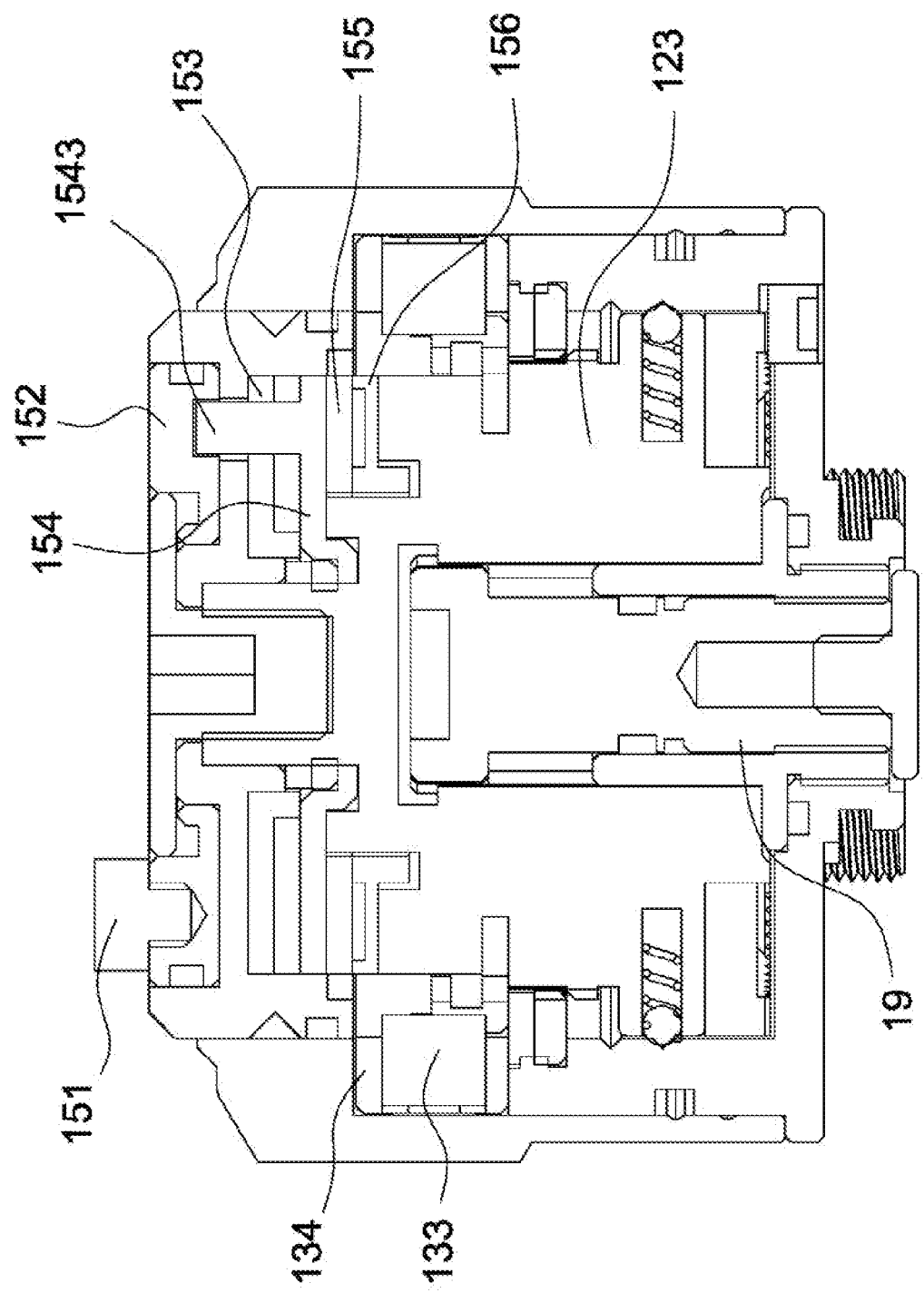
FIG. 3B is a sectional view of the compensating mechanism sectioned along B-B of FIG. 1.
Figure 4A:
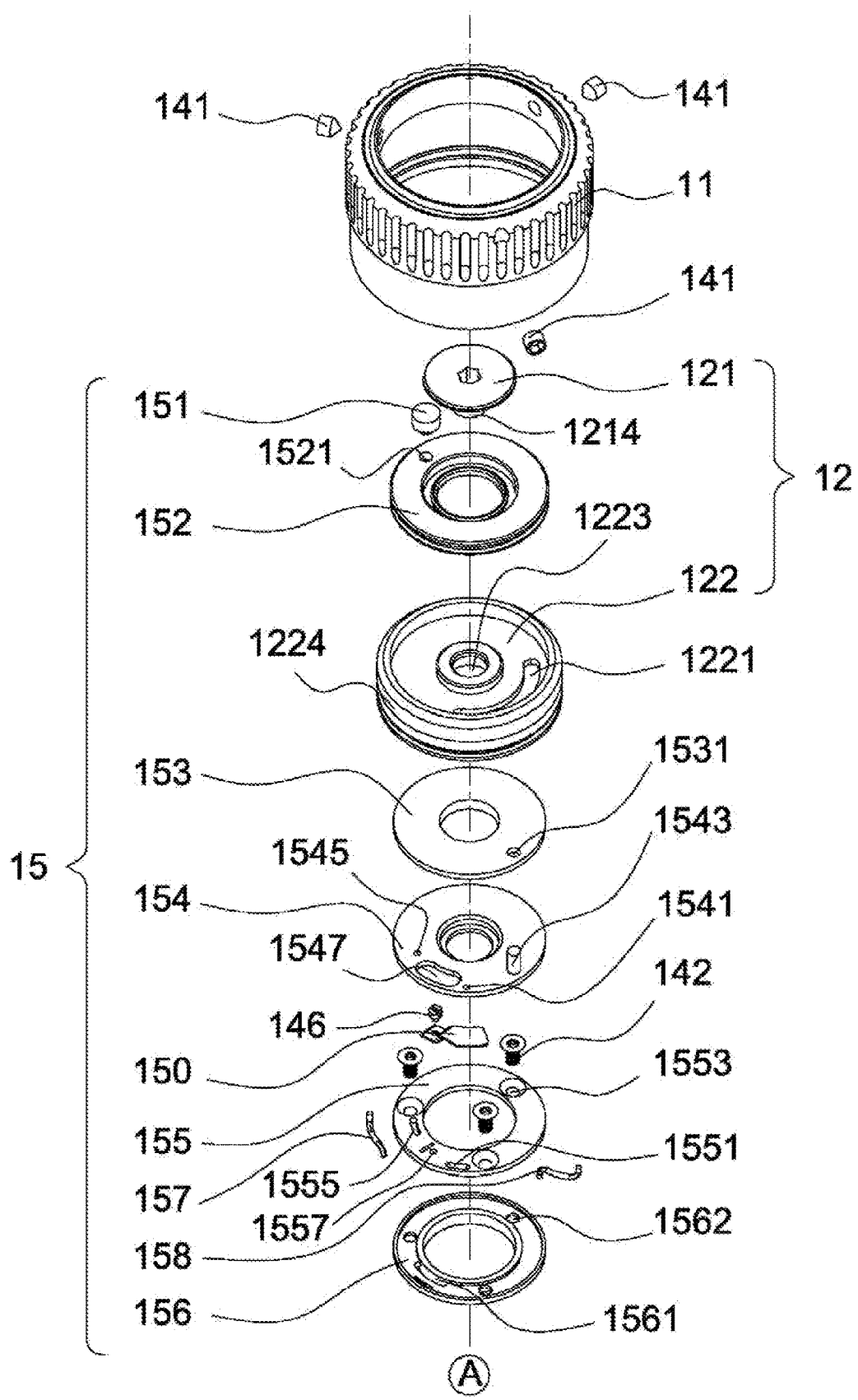
FIGS. 4A and 4B are exploded views of the compensating mechanism of FIG. 1.
Figure 4B:
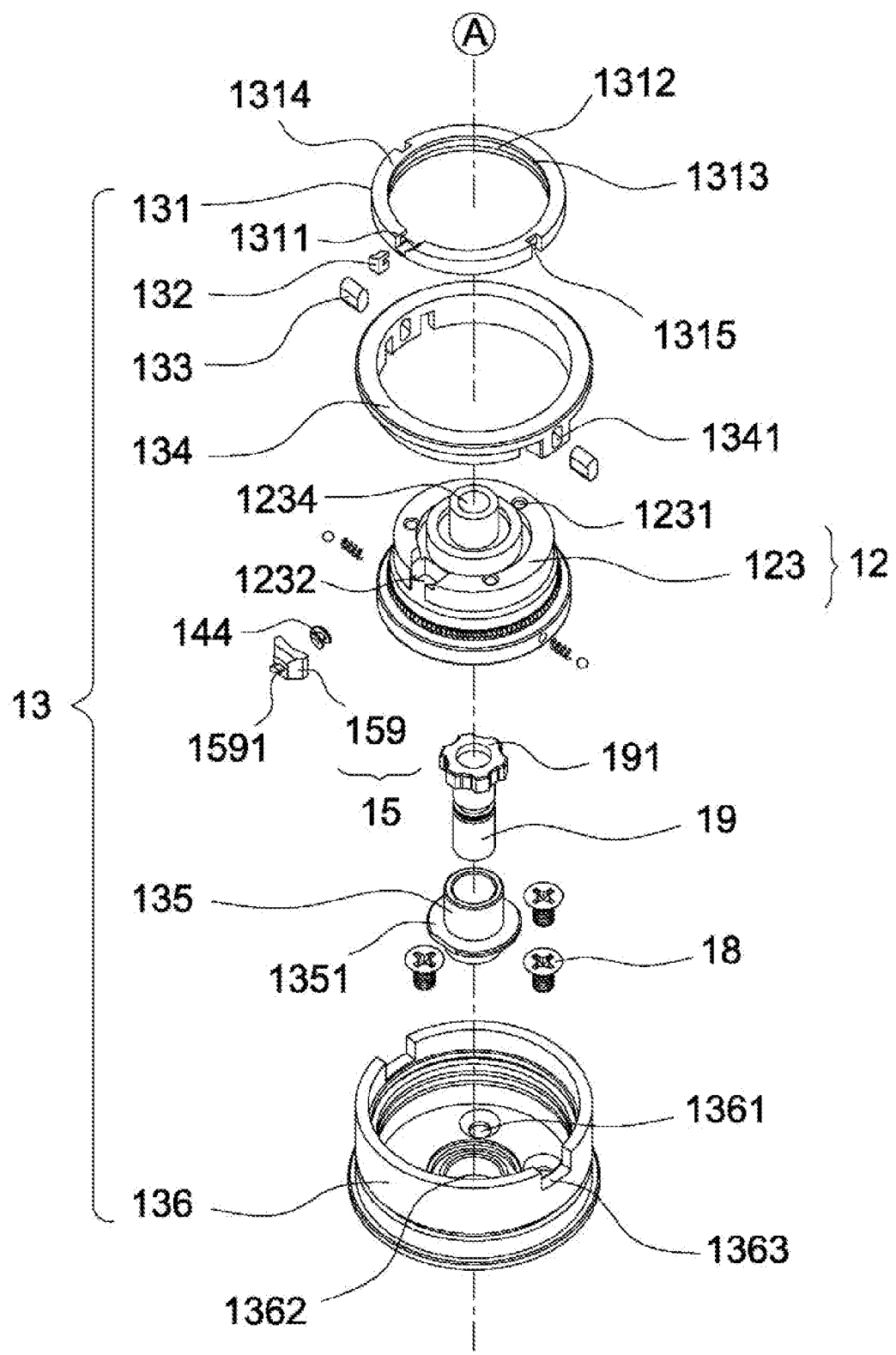

In an embodiment of the invention, a sight (not shown) includes a main body (not shown), an objective lens unit (not shown), an erecting lens barrel (not shown), an ocular lens unit (not shown) and a compensating mechanism 10 (shown in FIG. 1). The objective lens unit and the ocular lens unit are disposed at both ends of the main body, while the erecting lens barrel is disposed between the objective lens unit and the ocular lens unit. Thus, the objective lens unit, the erecting lens barrel and the ocular lens unit are sequentially arranged along an optical axis. The compensating mechanism 10 is disposed on the main body. An adjusting element 19 (shown in FIG. 2A) of the compensating mechanism 10 is propped against the erecting lens barrel. During operation, the user rotates the adjusting cap 11 of the compensating mechanism 10 to move the adjusting element 19 along an axis for correcting the bullet impact points. The detail of the operation will be described later. It is worth noting that the compensating mechanism 10 may be an elevation adjustment mechanism or a windage adjustment mechanism.

Referring to FIGS. 1-4, in addition to the above-mentioned adjusting cap 11 and adjusting element 19, the compensating mechanism 10 in accordance with an embodiment of the invention has a transmission unit 12, a base unit 13, a rotation setting unit 15, and other elements. The base unit 13 is fixed to the main body of the sight. The user can rotate the adjusting cap 11 to drive the adjusting element 19 through the transmission unit 12 so that the adjusting element 19 is moved toward or away from the main body of the sight, thereby correcting the bullet impact points. Further, the user can set the allowable number of rotation of the adjusting cap 11 by rotating the rotation setting unit 15, to provide a normal mode (without restricting the allowable number of rotation of the adjusting cap 11), a one-round mode (with the allowable number of rotation of the adjusting cap 11 restricted to one round) and a two-round mode (with the allowable number of rotation of the adjusting cap 11 restricted to two rounds). However, the invention is not limited thereto. More modes can be designed by reference to this embodiment and provided for the users to select. The structure of the elements and the assembly thereof are described in detail in the following:

The base unit 13 has an annular body 131, a blocking element 132, a key 133, a fixing ring 134, a sleeve 135 and a mount 136. The mount 133 is fixed to the main body of the sight by means of screws 18. The sleeve 135 is disposed on the mount 136 and has a flange 1351. The key 133 is placed to pass through a through hole 1341 of the fixing ring 134, with an end thereof extending into a concave cut 1363 formed on the side wall of the mount 136 and the other end thereof extending into an indentation 1315 formed on the outer circumference of the annular body 131. Accordingly, the annular body 131 cannot be rotated with respect to the mount 136. A first groove 1312 is formed on the inner surface of the annular body 131. A first sliding surface 1313 is formed in the first groove 1312. A second sliding surface 1314 and a concave portion 1311 are formed on the upper surface of the annular body 131. The first sliding surface 1313 and the second sliding surface 1314 are horizontal surfaces. A blocking element 132 is fixed to the interior of the concave portion 1311 by, for example, glue.

Figure 5:
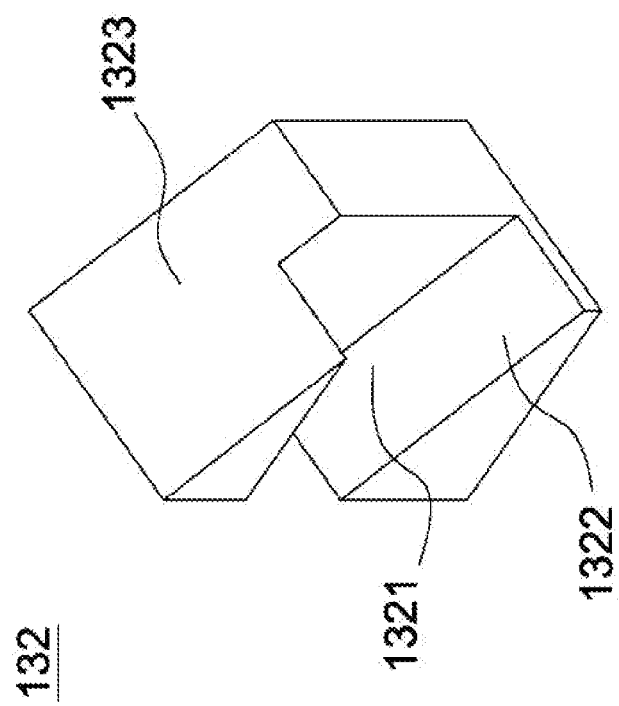
FIG. 5 is a perspective view of the blocking element of the compensating mechanism of FIG. 1.

Referring to FIG. 5, the blocking element 132 has a second groove 1321. A first guide surface 1322 is formed in the second groove 1321. The lower edge of the first guide surface 1322 is disposed next to the first sliding surface 1313 of the annular body 131, while the upper edge of the first guide surface 1322 is disposed next to the second sliding surface 1314 of the annular body 131. A second guide surface 1323 is formed on the upper surface of the blocking element 132. The lower edge of the second guide surface 1323 is disposed next to the second sliding surface 1314 of the annular body 131. The first groove 1312 has a first slope or a first curvature. The second groove 1321 has a second slope or a second curvature. In this embodiment, the first groove 1312 has a first slope and the first slope is 0 when the first groove 1312 is a horizontal groove, the second groove 1321 has a second slope and 0≤the second slope≤∞ when the second groove 1321 is an inclined groove, and the second groove 1321 has a second curvature and 0≤the second curvature ∞ when the second groove 1321 is a curved groove. In another embodiment, the first slope is 0 while the second slope is ∞. That is, the second groove 1321 is a vertical groove. In yet another embodiment, 0≤the first slope≤∞ and/or 0≤the second slope≤∞. That is, the first groove 1312 and/or the second groove 1321 is an inclined groove. In still yet another embodiment, 0≤the first curvature≤∞ and/or 0≤the second curvature≤∞. That is, the first groove 1312 and/or the second groove 1321 is a curved groove. In further still another embodiment, 0≤the first slope≤ and the second slope=∞. The second groove of the invention is provided for guiding the movable element 159 (described later) to ascend or descend. Specifically, the second groove has a first end communicated with the first groove, and a second end opposite to the first end. The first end and the second end have a height difference in the axial direction of the base unit. That is, the first end and the second end are not disposed at the same height or at the same level. When the first end is disposed lower than the second end and the movable element 159 is moved from the first end toward the second end, the movable element 159 ascends (i.e. this embodiment). When the first end is disposed higher than the second end, the movable element 159 descends. The second groove between the first end and the second end may be (but not limited to) an inclined groove, a curved groove or a vertical groove.

The transmission unit 12 includes transmission elements 121, 122 and a rotary shaft 123. A shaft portion 1214 of the transmission element 121 is placed to pass through the central hole 1223 of the transmission element 122 and to extend into the shaft hole 1234 of the rotary shaft 123. A hole 1232 is disposed on the side wall of the rotary shaft 123 for containing the movable element 159 of the rotation setting unit 15. A resilient element 144 is disposed in the hole 1232 and is propped against the movable element 159. The dimension of the hole 1232 is greater than that of the movable element 159 in a radial direction of the rotary shaft 123. Therefore, the movable element 159 under a force can move in the radial direction. Further, the dimension of the hole 1232 is greater than that of the movable element 159 in the axial direction of the rotary shaft 123. Therefore, the movable element 159 under a force can move in the axial direction.

The adjusting element 19 has a noncircular head portion 191. The rotary shaft 123 has a bore 1235 on its bottom for containing the head portion 191 of the adjusting element 19. The cross section of the bore 1235 is also non-circular. The bore 1235 matches the head portion 191 in shape. Therefore, the adjusting element 19 can be driven by the rotary shaft 123 to rotate when the rotary shaft 123 is rotated. The adjusting element 19 is penetrated into the sleeve 135 of the base unit 13. The adjusting element 19 has outer threads while the sleeve 135 has inner threads mating with the outer threads of the adjusting element 19.

In operation, the user can rotate the adjusting cap 11 to correct the bullet impact points wherein the adjusting cap 11 drives the transmission element 122 to rotate because the fixing elements 141 are propped against the groove 1224 formed on the outer circumference of the transmission element 122, and further drives the rotary shaft 123 to rotate by means of frictions because the transmission element 122 is tightly held between the transmission element 121 and the rotary shaft 123. As previously described, the adjusting element 19 is driven by the rotary shaft 123 to rotate when the rotary shaft 123 is rotated. Because the adjusting element 19 mates with the sleeve 135 of the base unit 13 by threads and the base unit 13 is fixed to the main body of the sight, the adjusting element 19, when rotated, is axially moved with respect to the base unit 13 so as to correct the bullet impact points. When the head portion 191 of the adjusting element 19 is lowered to abut against the top of the sleeve 135, the adjusting element 19 cannot be lowered more and is in a lower limit position. When the head portion 191 of the adjusting element 19 is raised to abut against the top surface of the bore 1235 of the rotary shaft 123, the adjusting element 19 cannot be raised more and is in an upper limit position.

Figure 6:
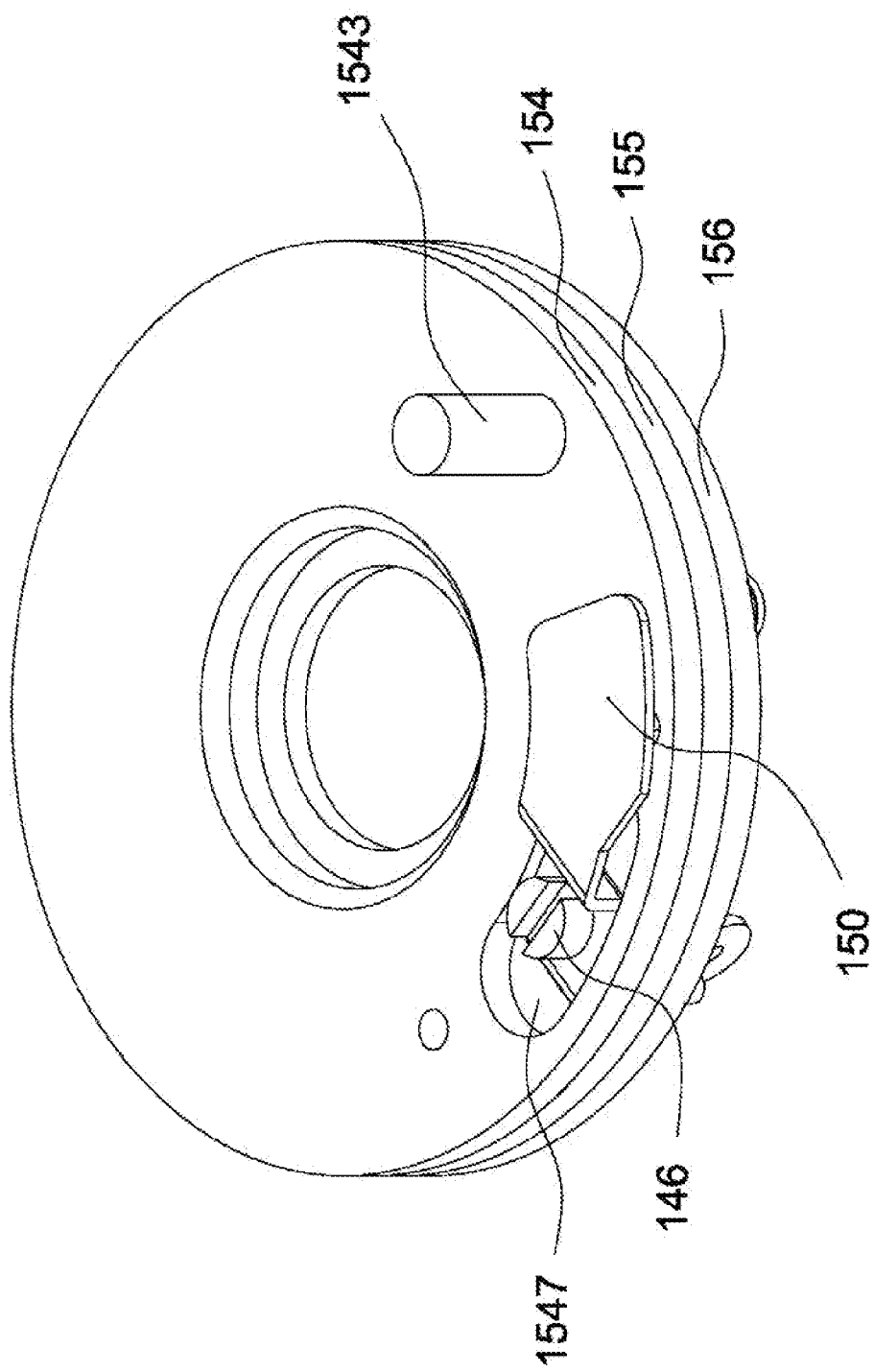
FIG. 6 depicts the assembly of the first setting plate, the second setting plate and the third setting plate of the compensating mechanism of FIG. 1.
Figure 7:
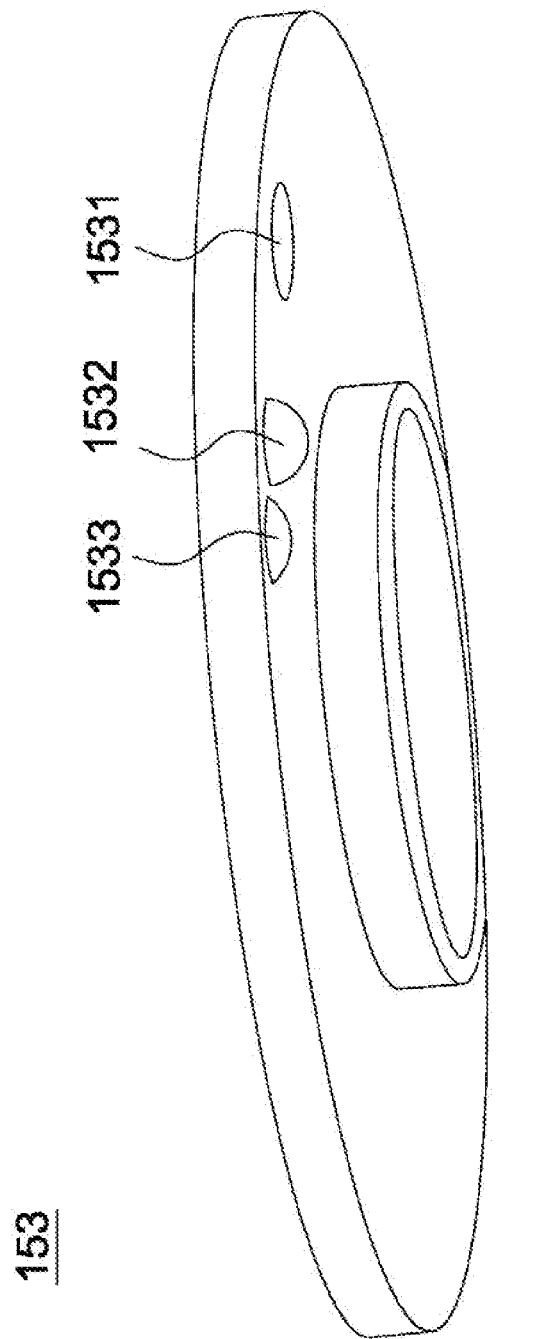
FIG. 7 is a perspective view of the fourth setting plate of the compensating mechanism of FIG. 1.

The rotation setting unit 15 includes a switching lever 151, a fifth setting plate 152, a fourth setting plate 153, a third setting plate 154, a compressing element 150, a second setting plate 155, a second constraining element 157, a first constraining element 158, a first setting plate 156 and the above-mentioned movable element 159. The movable element 159 has a laterally extending portion 1591. The second setting plate 155 and the first setting plate 156 are fixed to the rotary shaft 123 by penetrating the screws 142 through the screw holes 1553, 1562 into the screw holes 1231 of the rotary shaft 123. Therefore, the second setting plate 155 and the first setting plate 156 cannot be rotated with respect to the rotary shaft 123. Referring to FIG. 6, the third setting plate 154 is placed over the second setting plate 155 and is rotatable with respect to the second setting plate 155. The first constraining element 158 is elongated and flexible. Further, the first constraining element 158 has an upper end fixed to the fixing hole 1541 of the third setting plate 154, and a main body extending in the slit 1551 of the second setting plate 155, projecting from the opening 1561 of the first setting plate 156 and abutting against the movable element 159 to restrict the rotation of the adjusting cap 11 (the detail will be described later). The third setting plate 154 is rotatable with respect to the first setting plate 156 and the second setting plate 155 to adjust the length of the first constraining element 158 outside the opening 1561. The compressing element 150 is configured to compress the first constraining element 158. An end of the compressing element 150 is fixed to the second setting plate 155 by connecting the screw 146 to the screw hole 1557, and the other portion of the compressing element 150 passes through the slot 1547 and extends to the upper surface of the third setting plate 154. The second constraining element 157 is also elongated and flexible. The second constraining element 157 has an upper end fixed to the fixing hole 1545 of the third setting plate 154, and a main body extending in the groove 1555 of the second setting plate 155 and projecting from the opening 1561 of the first setting plate 156 to prevent a withdrawal of the laterally extending portion 1591 of the movable element 159 from the second groove 1321 of the blocking element 132 in the normal mode (the detail will be described later). The fourth setting plate 153 has a first protrusion 1532 and a second protrusion 1533 on the bottom (shown in FIG. 7). The first protrusion 1532 is raised higher than the second protrusion 1533. The first constraining element 158 is compressed by the compressing element 150, and the compressing element 150 is compressed by either the first protrusion 1532 or the second protrusion 1533 that depends on which mode is set to be performed. The switching lever 151 is fixed to the fixing hole 1521 of the fifth setting plate 152. The coupling lever 1543 sequentially passes through the through hole 1531 of the fourth setting plate 153 and the slot 1221 of the transmission element 122 and extend into the bottom of the fifth setting plate 152 (shown in FIG. 3). By such arrangement, the user is able to exert a force onto the switching lever 151 to set the allowable number of rotation of the adjusting cap 11 wherein the fifth setting plate 152 is driven by the switching lever 151 to rotate, the third setting plate 154 is driven by the fifth setting plate 152 to rotate, and the first constraining element 158 and the second constraining element 157 are pulled by the third setting plate 154 to adjust the length of the portion of the first constraining element 158 outside the opening 1561 as well as the length of the portion of the second constraining element 157 outside the opening 1561.

As described above, the user can set the allowable number of rotation of the adjusting cap 11 by rotating the rotation setting unit 15. Referring to FIG. 1, in operation, the user exerts a force to the switching lever 151 so as to rotate the fifth setting plate 152 until the indicating symbol (e.g. an arrow) on the adjusting cap 11 points at a mark on the fifth setting plate 152 (e.g. N, 1 or 2) that represents the allowable number of rotation of the adjusting cap 11. As a result, the compensating mechanism 10 of the invention enters a normal mode (without restricting the allowable number of rotation of the adjusting cap 11), a one-turn mode (with the allowable number of rotation of the adjusting cap 11 restricted to at most one round) or a two-round mode (with the allowable number of rotation of the adjusting cap 11 restricted to at most two rounds). It is worth noting that in different modes the movable element 159, the blocking element 132, the first constraining element 158 and the second constraining element 157 have different positions with respect to each other. The detail is described in the following:

Referring to FIG. 8, in a normal mode, the laterally extending portion 1591 of the movable element 159 is withdrawn from the second groove 1321 of the blocking element 132 and the first constraining element 158 is propped against the movable element 159 to avoid an entry of the movable element 159 into the second groove 1321 under an action of the resilient element 144. When the user rotates the adjusting cap 11 to correct the bullet impact points, the movable element 159 is rotated together with the rotary shaft 123. The laterally extending portion 1591 of the movable element 159 is allowed to slide on the first sliding surface 1313 in the first groove 1312 without obstruction, until the movable element 19 reaches the upper limit position or the lower limit position.

Figure 10:
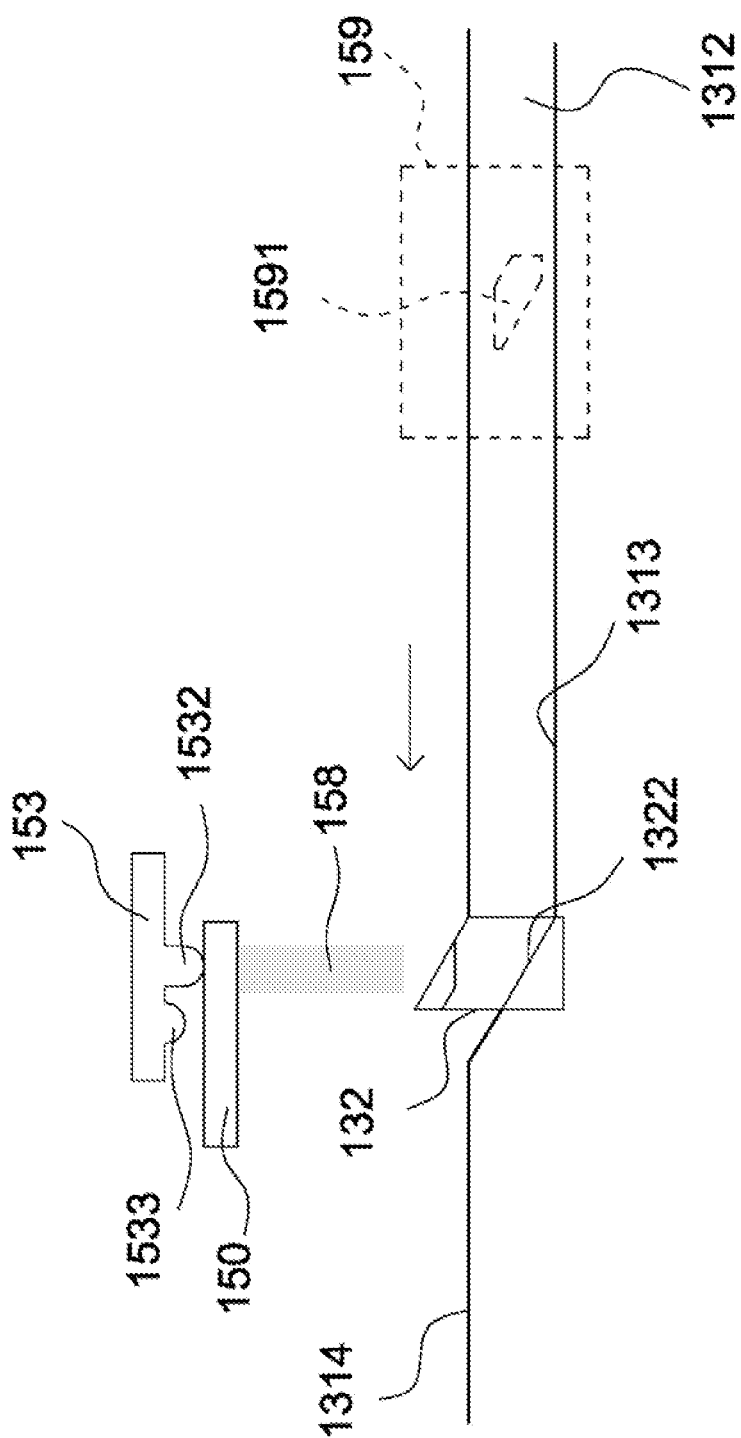
FIGS. 10-11 depict movement of the movable element of the compensating mechanism of FIG. 1 in the one-round mode, wherein the annular body of the base unit of the compensating mechanism is traverse sectioned and flattened.
Figure 11:
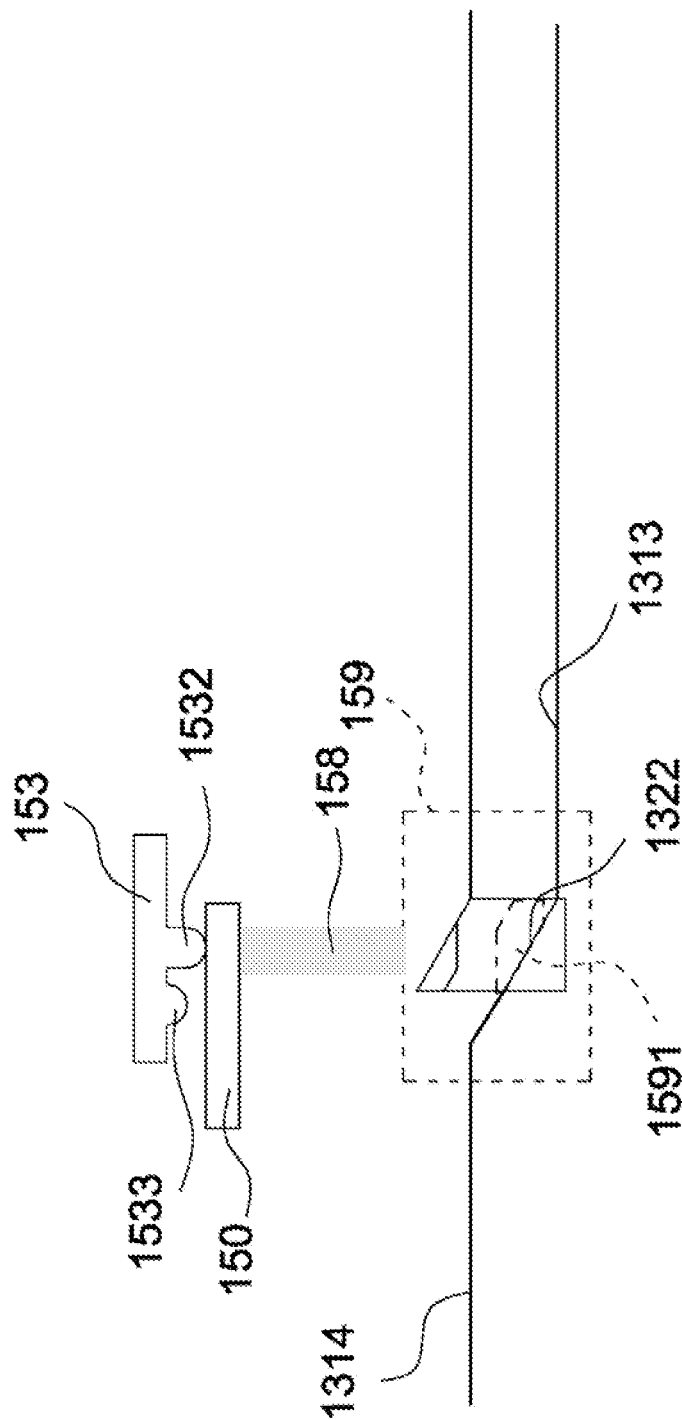

In a one-round mode, when the adjusting cap 11 is rotated a complete round, the movable element 159 is constrained from advancing. At this time, the laterally extending portion 1591 of the movable element 159 is exactly within the second groove 1321 of the blocking element 132 as shown in FIG. 9, and the second constraining element 157 is propped against the movable element 159 to prevent a withdrawal of the movable element 159 from the second groove 1321 under the restoring force of the resilient element 144. In detail, as shown in FIG. 10, in operation of correcting the bullet impact points, the laterally extending portion 1591 of the movable element 159 advances in the first groove 1312 of the annular body 131 in the arrow direction. As shown in FIG. 11, when the adjusting cap 11 is rotated a complete round, the laterally extending portion 1591 reaches the first guide surface 1322 of the blocking element 132. In order to keep advancing, the laterally extending portion 1591 has to ascend along the first guide surface 1322. However, the first constraining element 158 is propped against the movable element 159 so that the laterally extending portion 1591 fails to ascend along the first guide surface 1322. Therefore, the adjusting cap 11 cannot be rotated more. In other words, the adjusting cap 11 in the one-round mode can be rotated at most a complete round.

Figure 12:
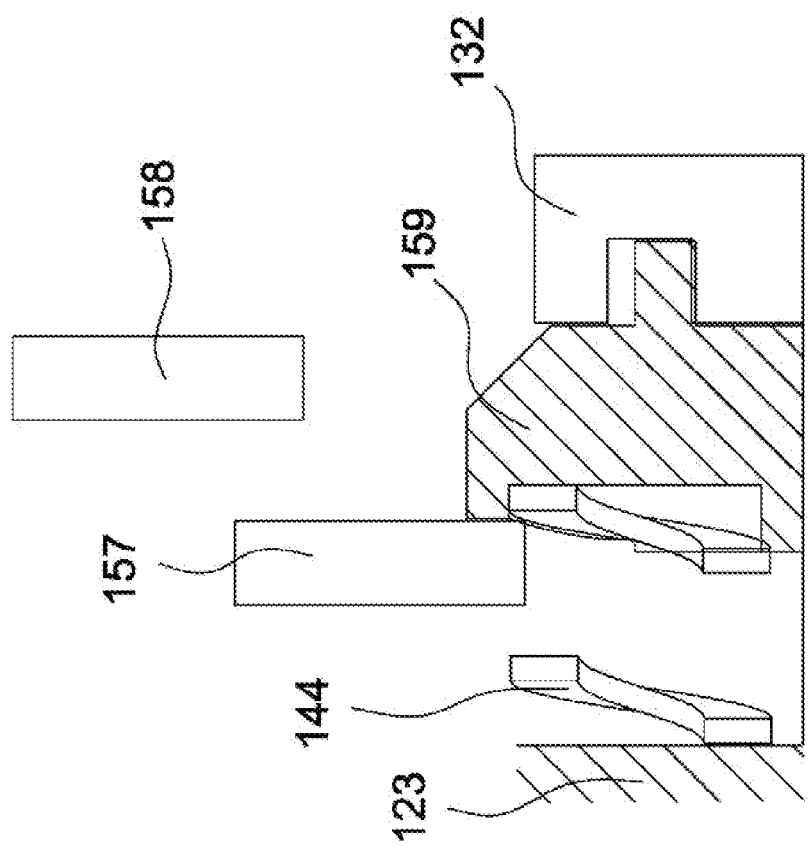
FIG. 12 depicts the relative positions of the movable element, the blocking element, the first constraining element and the second constraining element of the compensating mechanism of FIG. 1 in a two-round mode.
Figure 13:
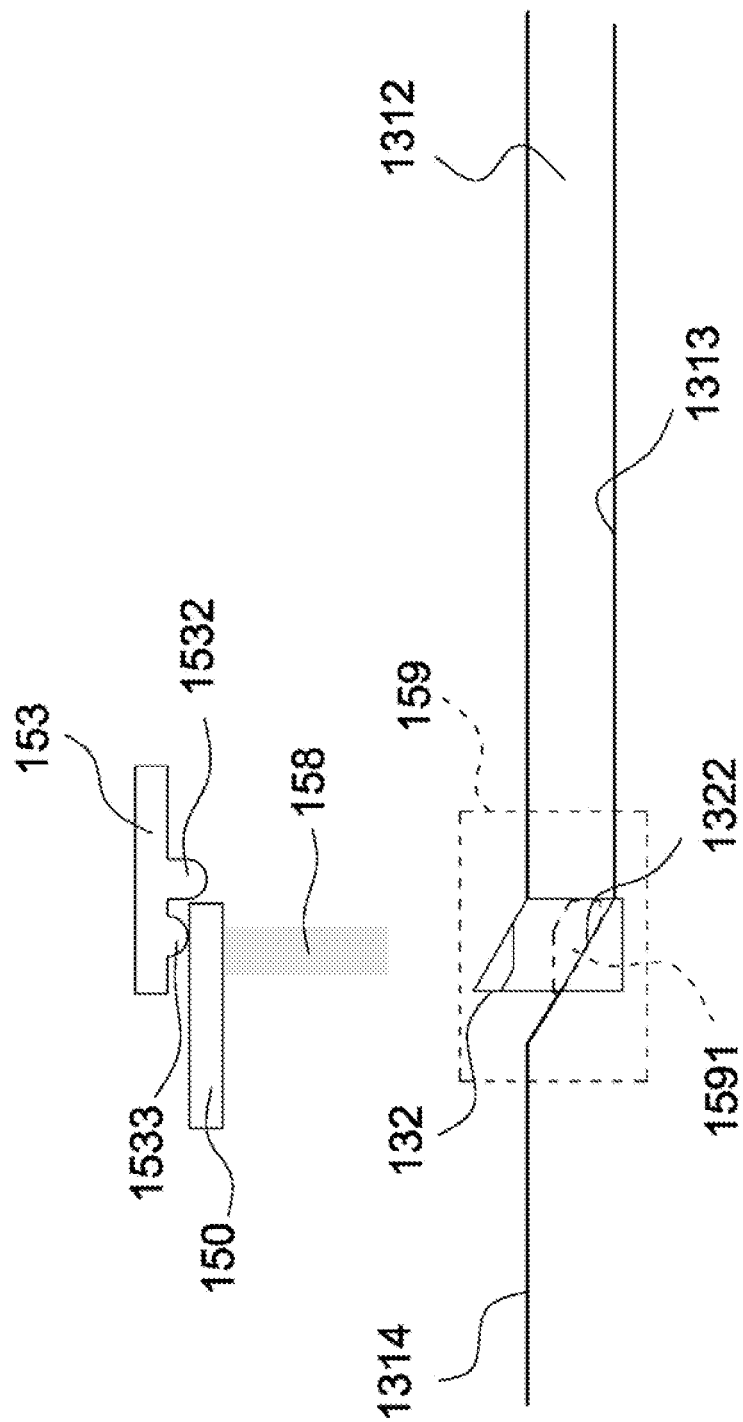
Figure 14:
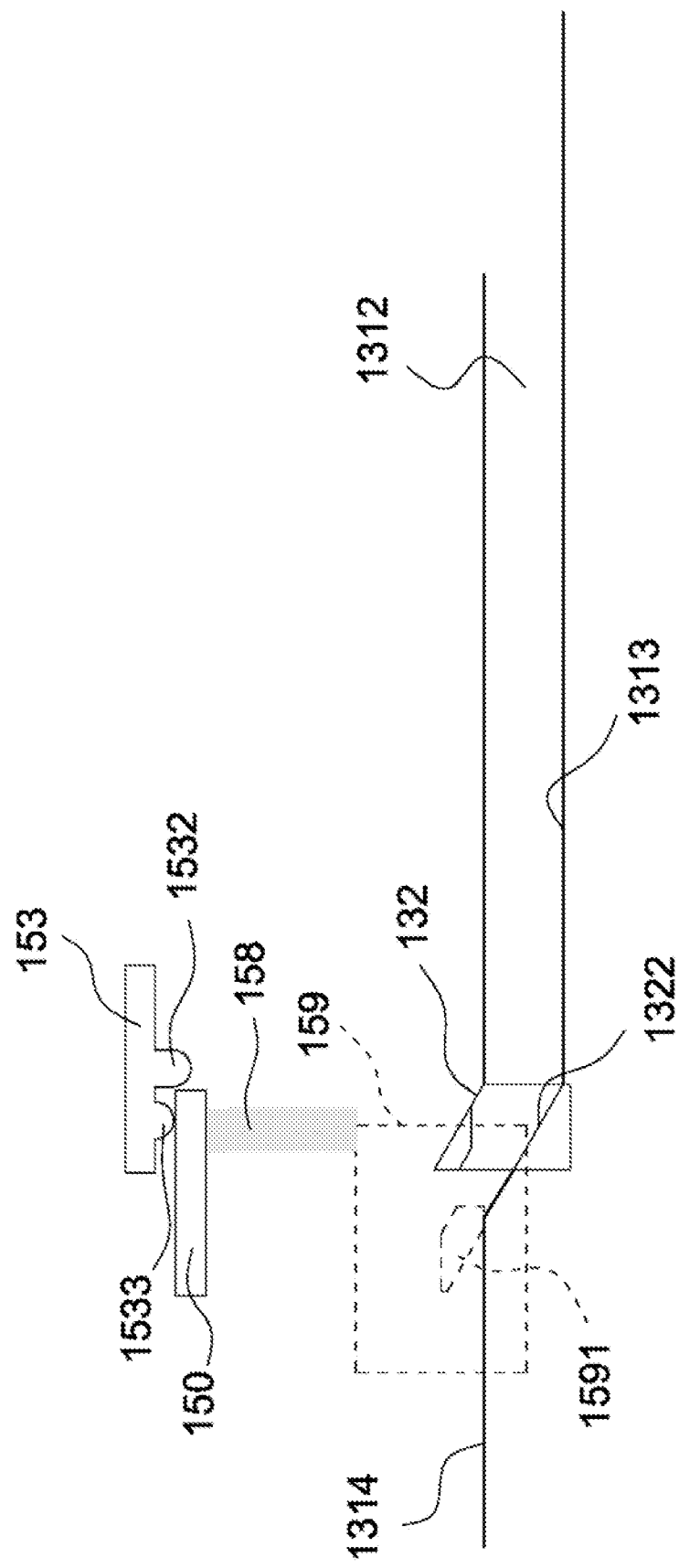
Figure 15:
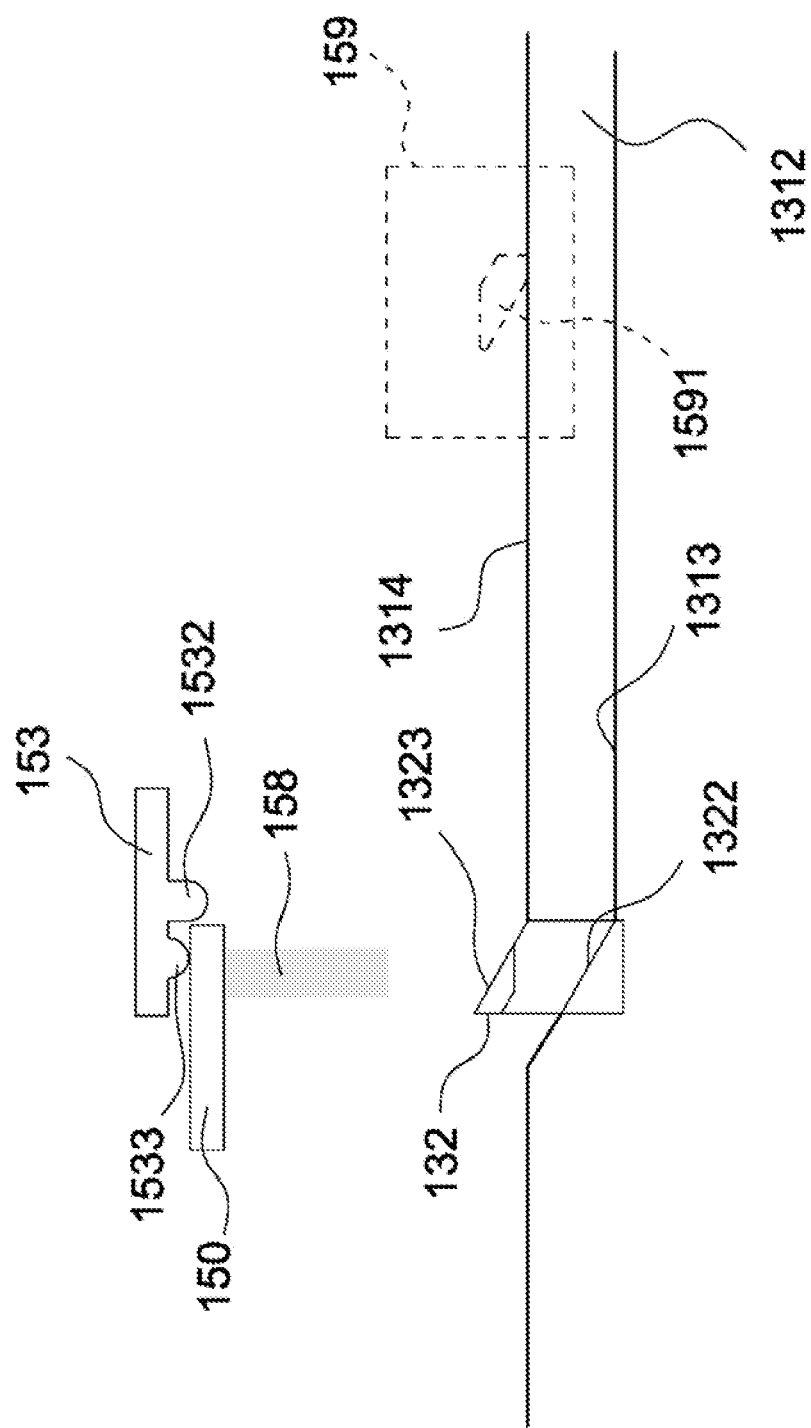

In a two-round mode, the first constraining element 158 is raised from a first position (FIG. 9) to a second position (FIG. 12). It can be found from FIG. 12 that the distance between the first constraining element 158 and the movable element 159 is increased, as compared to that in FIG. 9. By such arrangement, the adjusting cap 11 can be rotated without obstruction until the adjusting cap 11 is rotated two complete rounds. In detail, when the adjusting cap 11 is rotated a round, the laterally extending portion 1591 reaches the first guide surface 1322 of the blocking element 132 as described in the previous paragraph. In the two-round mode, the first constraining element 158 is raised without blocking the movable element 159. Therefore, the laterally extending portion 1591 is allowed to ascend along the first guide surface 1322 and to reach the second sliding surface 1314 as shown in FIG. 14, allowing the adjusting cap 11 to be further rotated (the second round). During the further rotation, the laterally extending portion 1591 slides along the second sliding surface 1314 as shown in FIG. 15. When the adjusting cap 11 is rotated two complete rounds, the laterally extending portion 1591 reaches the second guide surface 1323 of the blocking element 132 as shown in FIG. 16. In order to keep advancing, the laterally extending portion 1591 has to ascend along the second guide surface 1323. However, the first constraining element 158 is propped against the movable element 159 so that the laterally extending portion 1591 fails to ascend along the second guide surface 1323. Therefore, the adjusting cap 11 cannot be rotated more. In other words, the adjusting cap 11 in the two-round mode can be rotated at most two complete rounds.

In the one-round mode (FIG. 11), the first protrusion 1532 of the fourth setting plate 153 is arranged to compress the first constraining element 158 through the compressing element 150. In the two-round mode (FIG. 16), the second protrusion 1533 of the fourth setting plate 153 is arranged to compress the first constraining element 158 through the compressing element 150. It is worth noting that the first protrusion 1532 is raised higher than the second protrusion 1533. Therefore, the first constraining element 158 is in a higher position in FIG. 11 and is in a lower position in FIG. 16.

In brief, the compensating mechanism 10 includes a base unit 13, a transmission unit 12, an adjusting cap 11 and a rotation setting unit 15. The base unit 13 includes a blocking element 132. The transmission unit is disposed on the base unit 13. The adjusting cap 11 is connected to the transmission unit 12, wherein the adjusting cap 11 drives the transmission unit 12 to rotate when the adjusting cap 11 is rotated. The rotation setting unit 15 includes a movable element 159, wherein the movable element 159 is movably disposed on the transmission unit 12 to be connected to the blocking element 132 for restricting an allowable number of rotation of the adjusting cap 11 or to be separated from the blocking element 132 for unrestricting the number of rotation of the adjusting cap 11. By such arrangement, the allowable number of rotation of the adjusting cap 11 of the compensating mechanism 10 can be changed in accordance with user's requirements. Therefore, operation of the sight of the invention is convenient.

What is claimed is:

1. A compensating mechanism, comprising:
a base unit comprising a grooved portion wherein the grooved portion comprises a first groove and a second groove communicated with the first groove, the second groove comprises a first end and a second end opposite to the first end, the first end of the second groove is connected to the first groove, and the first end and the second end have a height difference therebetween in an axial direction of the base unit;
a transmission unit disposed on the base unit;
an adjusting cap connected to the transmission unit, wherein the adjusting cap drives the transmission unit to rotate when the adjusting cap is rotated; and
a rotation setting unit comprising a movable element, wherein the movable element is movably disposed on the transmission unit to be connected to the grooved portion or to be separated from the grooved portion.

2. The compensating mechanism as claimed in claim 1, wherein:
the rotation setting unit further comprises a first constraining element;
when the movable element is connected to the base unit and the adjusting cap is rotated, the movable element is driven by the adjusting cap through the transmission unit until the first constraining element is propped against the movable element.

3. The compensating mechanism as claimed in claim 2, wherein an allowable number of rotation of the adjusting cap is restricted when the movable element is moved to connect to the grooved portion.

4. The compensating mechanism as claimed in claim 3, wherein the allowable number of rotation of the adjusting cap is unrestricted when the movable element is moved to separate from the grooved portion.

5. The compensating mechanism as claimed in claim 3, wherein the movable element is restricted to move along the grooved portion when connecting to the grooved portion.

6. The compensating mechanism as claimed in claim 2, wherein:
the rotation setting unit further comprises a first setting plate, a second setting plate and a third setting plate;
the first setting plate comprises an opening;
the second setting plate comprises a slit;
the third setting plate comprises a fixing hole;
the first constraining element is elongated and comprises an end portion and a main body;
the end portion is fixed to the fixing hole;
the main body extends in the slit, projects from the slit and is propped against the movable element to restrict an allowable number of rotation of the adjusting cap.

7. The compensating mechanism as claimed in claim 6, wherein the third setting plate is rotatable with respect to the first setting plate and the second setting plate to adjust a length of the main body of the first constraining element outside the opening.

8. The compensating mechanism as claimed in claim 6, wherein:
the rotation setting unit further comprises a fourth setting plate and a compressing element;
the fourth setting plate comprises a first protrusion and a second protrusion;
the first protrusion is raised higher than the second protrusion;
the first constraining element is compressed by the compressing element;
the compressing element is selectively compressed by the first protrusion or the second protrusion.

9. The compensating mechanism as claimed in claim 1, wherein:
the first groove comprises a first sliding surface;
the second groove comprises a first guide surface disposed next to the first sliding surface;
the movable element comprises a laterally extending portion which is slidable on the first sliding surface;
the first constraining element is propped against the movable element to stop the adjusting cap from rotation when the first constraining element is in a first position and the laterally extending portion reaches the first guide surface.

10. The compensating mechanism as claimed in claim 9, wherein the first groove further comprises a first slope or a first curvature, the second groove further comprises a second slope or a second curvature, the first slope is different from the second slope, and the first curvature is different from the second curvature.

11. The compensating mechanism as claimed in claim 9, wherein:
the base unit further comprises a second sliding surface disposed next to the first guide surface;
a distance between the first constraining element and the movable element is increased so that the laterally extending portion can pass through the first sliding surface and reach the second sliding surface when the first constraining element is moved from the first position to a second position.

12. The compensating mechanism as claimed in claim 11, wherein:
the base unit further comprises a second guide surface disposed next to the second sliding surface;
the first constraining element is propped against the movable element to prevent the adjusting cap from further rotation when the first constraining element is in the second position and the laterally extending portion reaches the second guide surface.

13. The compensating mechanism as claimed in claim 1, wherein:
the rotation setting unit further comprises a second constraining element;
the second constraining element is propped against the movable element to prevent a separation of the movable element from the base unit when the movable element is connected to the grooved portion of the base unit.

14. The compensating mechanism as claimed in claim 13, wherein:
the rotation setting unit further comprises a first setting plate, a second setting plate and a third setting plate;
the first setting plate comprises an opening;
the second setting plate comprises a slit;
the third setting plate comprises a fixing hole;
the second constraining element is elongated and comprises an end portion and a main body;
the end portion is fixed to the fixing hole;
the main body extends in the slit, projects from the slit and is propped against the movable element to prevent a separation of the movable element from the base unit.

15. The compensating mechanism as claimed in claim 14, wherein the third setting plate is rotatable with respect to the first setting plate and the second setting plate to adjust a length of the main body of the second constraining element outside the opening.

16. The compensating mechanism as claimed in claim 1, wherein:
the base unit further comprises an annular body and a blocking element;
the annular body comprises a concave portion, the first groove is formed on the annular body, a first sliding surface is formed in the first groove, and a second sliding surface is formed outside the first groove and is parallel to the first sliding surface;
the blocking element is fixed to an interior of the concave portion, the second groove is formed on the blocking element and communicates with the first groove, a first guide surface is formed in the second groove and next to the first sliding surface, and a second guide surface is formed outside the second groove and next to the second sliding surface.

17. The compensating mechanism as claimed in claim 16, wherein the transmission unit comprises a rotary shaft, the rotary shaft comprises a hole containing the movable element, a dimension of the hole is greater than that of the movable element in a radial direction of the rotary shaft so that the movable element can be moved in the radial direction to separate from the blocking element, and another dimension of the hole is greater than that of the movable element in an axial direction of the rotary shaft so that the movable element can be moved in the axial direction to change an allowable number of rotation of the adjusting cap.

18. A sight, comprising:
a main body;
an objective lens unit;
an ocular lens unit, wherein the objective lens unit and the ocular lens unit are disposed at both ends of the main body;
an erecting lens barrel disposed within the main body and between the objective lens unit and the ocular lens unit; and
the compensating mechanism as claimed in claim 1, disposed on the main body, penetrated into the main body and placed against the erecting lens barrel.

19. A compensating mechanism, comprising:
a base unit comprising a blocking element;
a transmission unit disposed on the base unit;
an adjusting cap connected to the transmission unit, wherein the adjusting cap drives the transmission unit to rotate when the adjusting cap is rotated;
a rotation setting unit comprising a movable element, wherein the movable element is movably disposed on the transmission unit to be connected to the blocking element for restricting an allowable number of rotation of the adjusting cap or to be separated from the blocking element for unrestricting the number of rotation of the adjusting cap.

20. A sight, comprising:
a main body;
an objective lens unit;
an ocular lens unit, wherein the objective lens unit and the ocular lens unit are disposed at both ends of the main body;
an erecting lens barrel disposed within the main body and between the objective lens unit and the ocular lens unit; and
the compensating mechanism as claimed in claim 19, disposed on the main body, penetrated into the main body and placed against the erecting lens barrel.

* * * * *